(12) United States Patent
Hamm et al.

(10) Patent No.: US 7,236,913 B2
(45) Date of Patent: Jun. 26, 2007

(54) METHOD FOR SIMULATING A MECHATRONIC SYSTEM

(75) Inventors: Carsten Hamm, Erlangen (DE); Michael Louis, Nürnberg (DE); Wolfgang Papiernik, Neunkirchen (DE)

(73) Assignee: Siemens Aktiengesellschaft, München (DE)

( * ) Notice: Subject to any disclaimer, the term of this patent is extended or adjusted under 35 U.S.C. 154(b) by 715 days.

(21) Appl. No.: 10/466,008

(22) PCT Filed: Dec. 21, 2001

(86) PCT No.: PCT/DE01/04890

§ 371 (c)(1),
(2), (4) Date: Jul. 9, 2003

(87) PCT Pub. No.: WO02/057857

PCT Pub. Date: Jul. 25, 2002

(65) Prior Publication Data

US 2004/0049368 A1    Mar. 11, 2004

(30) Foreign Application Priority Data

Jan. 18, 2001 (DE) .............................. 101 02 313
Aug. 2, 2001 (DE) .............................. 101 37 909

(51) Int. Cl.
*G06G 7/48* (2006.01)

(52) U.S. Cl. .............................. 703/7; 702/113; 700/29

(58) Field of Classification Search ...................... 703/7
See application file for complete search history.

(56) References Cited

U.S. PATENT DOCUMENTS

| | | | | |
|---|---|---|---|---|
| 4,984,173 A | * | 1/1991 | Imam et al. | 700/279 |
| 5,111,124 A | * | 5/1992 | Kurosawa | 318/434 |
| 5,163,015 A | * | 11/1992 | Yokota | 703/7 |
| 5,381,775 A | * | 1/1995 | Birk et al. | 123/679 |
| 5,422,834 A | * | 6/1995 | Horiuchi et al. | 703/7 |
| 5,590,261 A | * | 12/1996 | Sclaroff et al. | 345/473 |
| 6,427,127 B1 | * | 7/2002 | Cunningham | 702/45 |

FOREIGN PATENT DOCUMENTS

EP    0 275 664 A1    7/1988

OTHER PUBLICATIONS

Ekinci et al., "A Circuit Theoretical Method for Efficient Finite Element Analysis of Acoustical Problems", Proceedings of the IEEE Ultrasonics Symposium, vol. 2, pp. 1251-1254, Oct. 1998.*

(Continued)

*Primary Examiner*—Paul Rodriguez
*Assistant Examiner*—Mary C. Jacob
(74) *Attorney, Agent, or Firm*—Henry M. Feiereisen

(57) ABSTRACT

According to the invention, a simulation is carried out based on the fundamental motion equation (1) for simulating the system by means of: transformation of the fundamental motion equation into linear differential equations of the first order; further transformation of the linear differential equations into time-discrete state variables; determination of the time response of the system by actualization of the resulting algebraic differential equations in the sampling raster of an associated control processor. Higher simulation accuracy is obtained at an essentially smaller calculating capacity.

4 Claims, 1 Drawing Sheet

OTHER PUBLICATIONS

Wang et al, "Seismic Response Analysis of Bridges Isolated with Friction Pendulum Bearings", Earthquake Engineering and Structural Dynamics, vol. 27, pp. 1069-1093, 1998.*

Neves et al, "Experimental and Numerical Analysis of Induction Motor Vibrations", IEEE Transactions on Magnetics, vol. 35, No. 3, pp. 1314-1317, May 1999.*

Fung, "Unconditionally Stable Higher-Order Accurate Hermitian Time Finite Elements", International Journal of Numerical Methods in Engineering, vol. 39, pp. 3475-3495, 1996.*

High-Tech Dictionary (www.computeruser.com): definitions of raster, raster display, raster image processor.*

Brandenburg, G. and Papiernik, W. ("Feedforward and Feedback Strategies Applying the Principle of Input Balancing for Minimal Tracking Errors in CNC Machine Tools", Proceedings of 4th International Workshop on Advanced Motion Control, vol. 2, pp. 612-618, Mar. 18-21, 1996.*

S. Kapucu et al.: "Tutorial Note on the Identification of Linear Mechanical Systems", in: Mechatronics, vol. 3, No. 7, Apr. 1997, p. 297-313:.

* cited by examiner

METHOD FOR SIMULATING A MECHATRONIC SYSTEM

BACKGROUND OF THE INVENTION

The invention relates to a method for simulation of mechatronic systems.

Mechatronic systems of this type include at least one mechanical and electrotechnical/electronic component combined to a unitary system as far as construction, configuration and operation are concerned. This fact is known under the term "mechatronic".

Conventionally, simulation of a mechanism is implemented either through application of multi-mass models, i.e. models with concentrated springs and masses whose differential equations are formed quasi "by hand", or preferably with so-called FEM models. Such FEM models or finite-element models are preferred in view of their greater accuracy, however they involve highly complex calculations.

In the latter case, a fundamental equation of motion is as follows:

$$M \cdot \vec{\ddot{u}} + D \cdot \vec{\dot{u}}(t) + C \cdot \vec{u}(t) = \vec{F}(t) \quad (1)$$

wherein

M is the mass matrix,
D is the damping matrix,
C is the stiffness matrix,
$\vec{F}$ are the nodal forces,
$\vec{u}$ is the nodal displacement vector, and
t is the time.

This calculation instruction is integrated in such a finite-element model in a manner known to the artisan.

In order to solve the fundamental motion equation (1), diverse time integration processes are used which are enormously time consuming because the width of the integration step has to be selected small enough to maintain an integration error within acceptable limits to satisfy the demand on the accuracy.

SUMMARY OF THE INVENTION

It is therefore an object of the invention, to provide a method of the afore-stated type that has a reduced need for calculation and increased accuracy of simulation compared to afore-illustrated conventional methods.

This object is attained in accordance with the present invention by carrying out on the basis of the fundamental equation of motion (1)

$$M \cdot \vec{\ddot{u}} + D \cdot \vec{\dot{u}}(t) + C \cdot \vec{u}(t) = \vec{F}(t) \quad (1)$$

the following successive method steps for simulating the system:
- transformation of the fundamental equation of motion into first order linear differential equations,
- further transformation of the linear differential equations into time discrete state equations,
- determination of the time response of the system through actualization of the resultant algebraic difference equations in a sampling raster of an associated control processor.

According to a first advantageous embodiment of the method of the present invention, the fundamental motion equation is transformed into first order linear differential equations in the modal space. In this way, it is possible to select or deselect predeterminable eigenmodes before carrying out a time discretization.

According to a further advantageous embodiment of the method according to the present invention, differential equations are added in order to simulate time delays of the nodal forces $\vec{F}$ and considered when determining the time response of the system. In this way, it can be taken into account that such forces normally build up only with a time delay.

Of course, there is also the possibility to incorporate additional forces in the system without time delay, when required by the actual situation (e.g. simulation of gravity). This is preferably realized by considering additional non-time-delayed forces $\vec{F}D$ in the system by splitting the force vector $\vec{F}$ into a contribution from forces $\vec{F}R$ with a time delay and a contribution from forces $\vec{F}D$ without a time delay when determining the time response of the system.

It has been proven as particularly advantageous to describe the differential equations for simulation of time delays of the nodal forces $\vec{F}$ by a PT1 control element as a final control element, whereby the desired force represents the manipulated variable of this controller.

In principle, it is, of course, also possible to use final control elements with an arbitrary transfer function.

According to a further advantageous embodiment of the method according to the present invention, the mechanical part of the mechatronic system can be described by modal coordinates and their time derivatives, resulting in the fundamental motion equation $$\overline{M} \cdot \vec{\ddot{q}}(t) + \overline{D} \cdot \vec{\dot{q}}(t) + \overline{C} \cdot \vec{q}(t) = \vec{Q}(t)$$

wherein
$\overline{M} = X' \cdot M \cdot X$ is the modal mass matrix,
$\overline{D} = X' \cdot D \cdot X$ is the modal damping matrix,
$\overline{C} = X' \cdot C \cdot X$ is the modal stiffness matrix,
X is the matrix of the eigenvectors of the undamped system,
$\vec{q}$ are the generalized modal coordinates
$\vec{u} = X \cdot \vec{q}$ are the nodal shifts
$\vec{Q} = X' \cdot \vec{F}$ are the generalized modal forces.

BRIEF DESCRIPTION OF THE DRAWING

Further advantages and details of the invention can be seen from the following representation of the computational mathematical relationships to be read in connection with the FIGURE. It is shown schematically in.

DETAILED DESCRIPTION OF THE PREFERRED EMBODIMENTS

Figure 1:
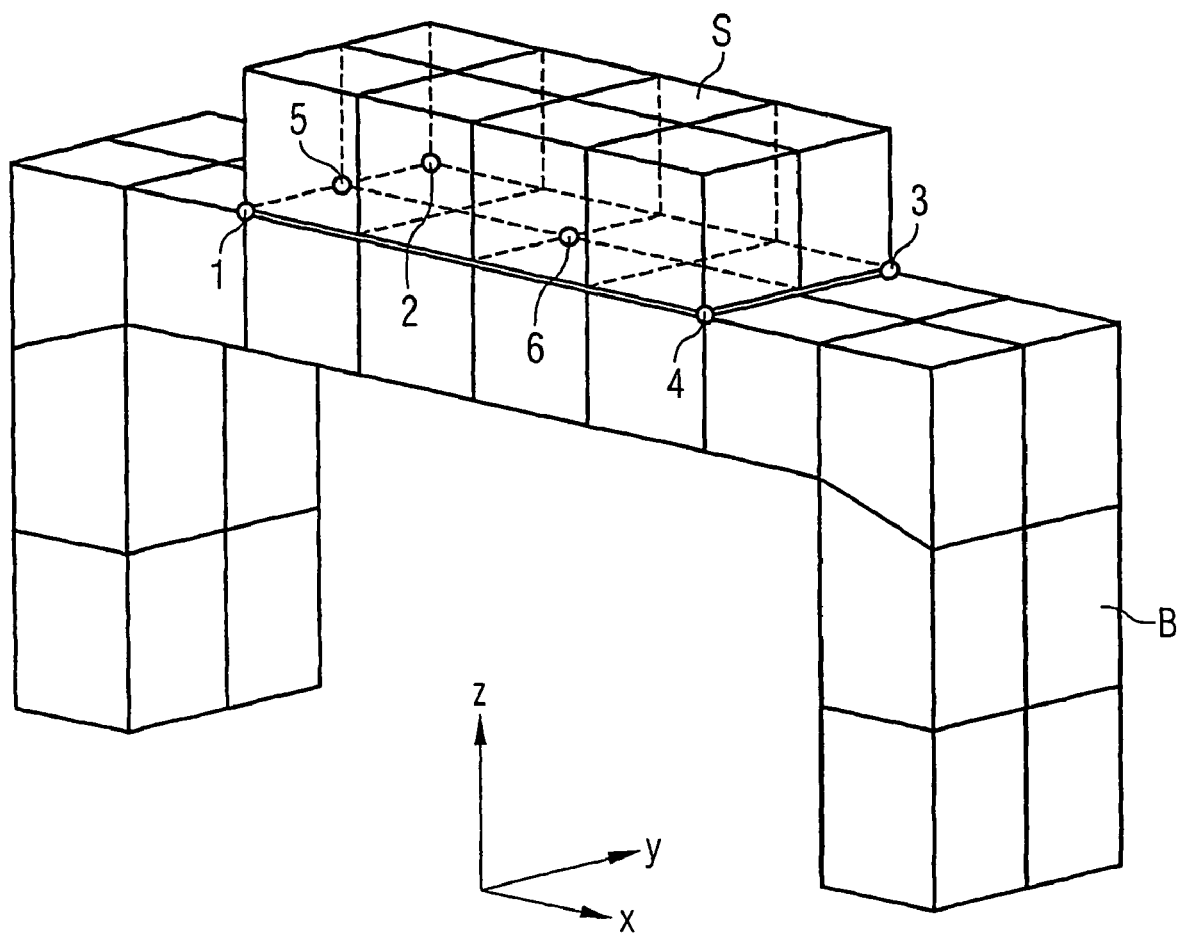
FIG. 1 a finite element model of a mechanical bridge with a movable carriage.

In accordance with the invention, the fundamental motion equation (1) described above is initially transformed into normal standard state equations, in particular into first order linear differential equations, preferably in the modal space. These equations are subsequently discretized with respect to time so that only algebraic difference equations instead of the differential equations have to be solved to determine the time response of the system. This can be implemented with current computer systems in a simple and effective manner.

With this transformation, the time response of the simulated system can be determined by actualizing the time raster, i.e. the calculation of the difference equations, only in the sampling raster of the control processor. This is the case because only the values in the clock cycle of a computer that executes the calculation are relevant. The calculating step $$\begin{bmatrix} \vec{\dot{x}}_1 \\ \vec{\dot{x}}_2 \\ \vec{\dot{x}}_3 \end{bmatrix} = \underbrace{\begin{bmatrix} 0 & I & 0 \\ -M^{-1} \cdot C & -M^{-1} \cdot D & M^{-1} \\ 0 & 0 & -1/T_{ers,F} \end{bmatrix}}_{A} \underbrace{\begin{bmatrix} \vec{x}_1 \\ \vec{x}_2 \\ \vec{x}_3 \end{bmatrix}}_{\vec{x}} \div \underbrace{\begin{bmatrix} 0 & 0 \\ 0 & M^{-1} \\ 1/T_{ers,F} & 0 \end{bmatrix}}_{B} \cdot \underbrace{\begin{bmatrix} \vec{F}^{w}_R \\ \vec{F}_D \end{bmatrix}}_{\vec{u}}. \quad (6a)$$

width can thus be reduced from typically between 1 and 5 msec to 100 μsec, depending on the required accuracy.

The obtained solution according to the invention of the algebraic equations is exact, whereas the conventional solution of differential equations for simulation constitutes only an approximation.

The essential advantages of this approach are an improved simulation accuracy and significant time-savings so that the simulation has significant practical significance for the user. In general, the time savings in comparison to the afore-described conventional methods are more than a factor of 1000.

Essential for the invention is hereby the "approach" of the computational process, as illustrated in the following:

Based on the fundamental motion equation (1), the following is initially defined—for reasons of better illustration:

$$\vec{u} := \vec{x}_1 \text{ and } \vec{x}_1 := \vec{x}_2 \quad (2)$$

As a result, the fundamental motion equation (1) yields the following calculation instruction $$M \cdot \vec{\dot{x}}_2 + D \cdot \vec{x}_2 + C \cdot \vec{x}_1 = \vec{F} \quad (3)$$

Both equations (2) and (3) can now be combined:

$$\begin{bmatrix} \vec{\dot{x}}_1 \\ \vec{\dot{x}}_2 \end{bmatrix} = \begin{bmatrix} 0 & I \\ -M^{-1} \cdot C & M^{-1} \cdot D \end{bmatrix} \cdot \begin{bmatrix} \vec{x}_1 \\ \vec{x}_2 \end{bmatrix} + \begin{bmatrix} 0 \\ M^{-1} \end{bmatrix} \cdot \vec{F} \quad (4)$$

The fact that the force can normally be built up only with a delay is considered through addition of respective differential equations. In the simplest case, the final control element can be described by a PT1-element. As a result, the force is:

$$\vec{\dot{F}} = -\frac{1}{T_{ers,F}} \cdot \vec{F} + \frac{1}{T_{ers,F}} \cdot \vec{F}^w \quad (5)$$

wherein $T_{ers,F}$ is the time constant of the PT1-element and $\vec{F}^w$ is the desired force (manipulated variable of the controller).

The computational instruction (5) can now be combined with the computational instruction (4). By defining $\vec{F} := \vec{x}_3$, $$\begin{bmatrix} \vec{\dot{x}}_1 \\ \vec{\dot{x}}_2 \\ \vec{\dot{x}}_3 \end{bmatrix} = \underbrace{\begin{bmatrix} 0 & I & 0 \\ -M^{-1} \cdot C & -M^{-1} \cdot D & M^{-1} \\ 0 & 0 & -1/T_{ers,F} \end{bmatrix}}_{A} \underbrace{\begin{bmatrix} \vec{x}_1 \\ \vec{x}_2 \\ \vec{x}_3 \end{bmatrix}}_{\vec{x}} \div \underbrace{\begin{bmatrix} 0 \\ 0 \\ 1/T_{ers,F} \end{bmatrix}}_{B} \cdot \vec{F}^w \quad (6)$$

If additional non-delayed forces $F_D$ act in the system, then these forces can be considered by splitting the force vector in a contribution from forces $F_R$ with a time delay and a contribution from forces $F_D$ without a time delay. The computational instruction (6) then yields The computational instructions (6) or (6a) represent each a standard state equation for describing control processes and can be transformed in a conventional manner into the discrete state equations $$\vec{x}_{(k+1)T} = A_d \cdot x_{kT} + B_d \cdot u_{kT} \quad (7)$$

wherein the discrete system matrices $A_d$ and $B_d$ are defined by $$A_d = e^{A \cdot T}, \; B_d = \int_0^T e^{A \cdot v} B \, dv. \quad (8)$$

Since the manipulated variable u can only change in the sampling raster, the preceding computational instruction (8) exactly describes the behavior of the system at the sampling instants.

Suitably, modal coordinates and their time derivatives are used for describing the states of the mechanical system. The system can then be transformed into the so-called "modal space" by transforming the coordinates of a finite element system which is defined by the fundamental motion equation (1) with the matrix of the eigenvectors X and the generalized modal coordinates $\vec{q}$.

By substituting $\vec{u} = X \cdot \vec{q}$, the fundamental motion equation (1) is changed to $$\overline{M} \cdot \vec{\ddot{q}} + \overline{D} \cdot \vec{\dot{q}}(t) + \overline{C} \cdot \vec{q}(t) = \vec{Q}(t) \quad (9)$$

wherein in detail
$\overline{M} = X' \cdot M \cdot X$ is the modal mass matrix,
$\overline{D} = X' \cdot D \cdot X$ is the modal damping matrix,
$\overline{C} = X' \cdot C \cdot X$ is the modal stiffness matrix,
X is the matrix of the characteristic vector of the undamped system,
$\vec{q}$ are the generalized modal coordinates
$\vec{u} = X \cdot \vec{q}$ are the nodal shifts
$\vec{Q} = X' \cdot \vec{F}$ are the generalized modal forces.

In this way, it is ensured that the inverse $\overline{M}^{-1}$, which is required for calculating the equation (6), always exists, because the modal mass matrix $\overline{M}$ is always positive definite.

The state description in modal space advantageously allows (de)selection of certain predetermined eigenmodes before time discretization.

The illustration of FIG. 1 shows a finite element model of a simple mechanical bridge B on which a carriage S can travel in an x-direction x. A schematically indicated coordinate system shows the spatial arrangement of the x-direction x, the y-direction y, and the z-direction z. Further shown by way of example are attachment nodes 1 to 4, a measuring node 5, and a force introduction node 6, for implementing the simulation.

The stiffness at the attachment nodes is thus equal to 0 in the x-direction x, whereas the stiffness is preset in y- and z-directions y, z by the stiffness of the guides. The structural characteristic is depicted by volume elements.

When simulating this finite element model with a FEM program, the number of nodes can generate about 200 natural frequencies in this model, of which only the lower 20 frequencies are relevant for the behavior of the system. Therefore, only these natural frequencies are selected and the respective standard state equations are extracted in the form of the system matrices.

Thus, system matrices of the order 43 are generated:
20 conjugated complex eigenvalues result in the order 40,
1 rigid body mode with a dual pole at the origin, as the carriage can travel freely in the x-direction,
1 negative real eigenvalue resulting from the simulation of the current control circuit.
in total, a system order of 43 is obtained for the computational process (6).

Correspondingly, the system order following the discretization according to the computational processes (7) and (8) is also of the order 43.

For example, a step response can be simulated with the method of the invention using, for example, the program 'Matlab/Simulink/Realtime-Workshop' within 130 msec. The simulation of the same process in a conventional manner takes 11 min using, for example, the software tool 'PERMAS', i.e. the simulation time can be shortened by about the factor 5000 through use of the present patent application.

What is claimed is:

1. A method for simulating a mechatronic system having a plurality of interconnected components, comprising the steps of:

defining physical parameters of the interconnected components, said physical parameters including a mass matrix M, a damping matrix D, stiffness matrix C, nodal forces $\vec{F}$, and a nodal displacement vector $\vec{u}$;

transforming a fundamental equation of motion $M \cdot \ddot{\vec{u}} + D \cdot \dot{\vec{u}}(t) + C \cdot \vec{u}(t) = \vec{F}(t)$ into a first order linear differential equation;

adding another differential equation for simulating a time delay of the nodal forces;

generating an algebraic difference equation by transforming the first order linear differential equation and the added differential equation into a time-discrete state equation;

actualizing the resultant algebraic difference equation at sampling instants of an associated control processor; and simulating the mechatronic system using the time-discrete state equation, thereby determining a temporal characteristic of the mechatronic system with a reduced number of calculations and an increased simulation accuracy.

2. The method of claim 1, wherein the transforming step of the fundamental motion equation into a first order linear differential equation is realized in a modal space.

3. The method of claim 1, wherein the adding step includes the step of considering additional forces without a time delay in the system by splitting the force vector into a contribution from forces with a time delay and a contribution from forces without a time-delay.

4. The method of claim 1, wherein modal coordinates and their time derivatives are provided for describing a mechanical part of the mechatronic system to thereby result in the fundamental motion equation ti $\overline{M} \cdot \ddot{\vec{q}}(t) = \overline{D} \cdot \dot{\vec{q}}(t) + \overline{C} \cdot \vec{q}(t) = \vec{Q}(t)$ wherein $\overline{M} = X' \cdot M \cdot X$ is the modal mass matrix, $\overline{D} = X' \cdot D \cdot X$ is the modal damping matrix, $\overline{C} X' \cdot C \cdot X$ is the modal stiffness matrix, X is the matrix of the characteristic vector of the non-damped system, $\vec{q}$ are the generalized modal coordinates $\vec{u} = X \cdot \vec{q}$ are the nodal shifts $\vec{Q} = X' \cdot \vec{F}$ are the generalized modal forces.

* * * * *

UNITED STATES PATENT AND TRADEMARK OFFICE
CERTIFICATE OF CORRECTION

| | | |
|---|---|---|
| PATENT NO. | : 7,236,913 B2 | Page 1 of 1 |
| APPLICATION NO. | : 10/466008 | |
| DATED | : June 26, 2007 | |
| INVENTOR(S) | : Carsten Hamm et al. | |

It is certified that error appears in the above-identified patent and that said Letters Patent is hereby corrected as shown below:

Column 6:

Claim 4, line 5:

Delete "$\overline{C}X'\cdot C\cdot X$" and replace with --$\overline{C}=X'\cdot C\cdot X$--

Signed and Sealed this

Twentieth Day of May, 2008

JON W. DUDAS
*Director of the United States Patent and Trademark Office*